(12) United States Patent
Biensan et al.

(10) Patent No.: US 11,322,791 B2
(45) Date of Patent: May 3, 2022

(54) MULTI-BATTERY ASSEMBLY AND CONTAINER COMPRISING SUCH AN ASSEMBLY

(71) Applicant: SAFT, Levallois-Perret (FR)

(72) Inventors: Philippe Biensan, Carignan de Bordeaux (FR); Dominique Ligeois, Saint Loubes (FR)

(73) Assignee: SAFT, Levallois-Perret (FR)

( * ) Notice: Subject to any disclaimer, the term of this patent is extended or adjusted under 35 U.S.C. 154(b) by 149 days.

(21) Appl. No.: 16/631,723

(22) PCT Filed: Aug. 2, 2018

(86) PCT No.: PCT/EP2018/071089
§ 371 (c)(1),
(2) Date: Jan. 16, 2020

(87) PCT Pub. No.: WO2019/025577
PCT Pub. Date: Feb. 7, 2019

(65) Prior Publication Data
US 2020/0168865 A1 May 28, 2020

(30) Foreign Application Priority Data

Aug. 3, 2017 (FR) ...................................... 1757492

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01)

(58) Field of Classification Search
CPC ............... H01M 50/20; H01M 50/502; H01M 2220/10; H01M 2220/20; H01M 10/4207; Y02E 60/10
See application file for complete search history.

(56) References Cited

U.S. PATENT DOCUMENTS 7,838,142 B2 * 11/2010 Scheucher ............ H01M 50/20
429/99
8,366,371 B2 * 2/2013 Maniscalco ........... H01M 50/20
414/279
(Continued)

FOREIGN PATENT DOCUMENTS

EP 2 866 295 A1 4/2015
JP 2013-030382 A 2/2013

OTHER PUBLICATIONS

International Search Report for PCT/EP2018/071089 dated Oct. 16, 2018 [PCT/ISA/210].
(Continued)

*Primary Examiner* — Michael L Dignan
(74) *Attorney, Agent, or Firm* — Sughrue Mion, PLLC

(57) ABSTRACT

The invention concerns a multi-battery assembly, and a container comprising such an assembly, for use in particular in the field of high energy-density assemblies comprising a plurality of Ni—Cd, Ni-MH, lead-acid or Li-ion stationary batteries stored in a container or a library-like room. The multi-battery assembly comprises at least three rows (1 to 4) of batteries (12 to 23) connected in series and/or parallel, including two end rows (1, 4) and at least two intermediate rows (2, 3), each row being connected in series and/or parallel to at least one adjacent row, extending in a first direction (d1), and comprising at least one level (36 to 38) of a plurality of batteries connected in series and/or parallel, each of the levels extending in the first direction (d1). At least each intermediate row is a row that is movable relative to an adjacent row in a second direction (d2) substantially perpendicular to the first direction (d1), and is connected in series and/or parallel to said adjacent row by one of the batteries of one of the levels of same and by one of the batteries of one of the levels of said adjacent row by means of a connection element (60 to 63) that is configured to
(Continued)

maintain the connection between the movable row and the adjacent row while allowing the movable row to move relative to the adjacent row in the second direction (d2), so as to allow at least one temporary corridor (50) to be created between the movable row and the adjacent row without disconnection.

21 Claims, 3 Drawing Sheets

(56) References Cited

U.S. PATENT DOCUMENTS

| | | | | |
|---|---|---|---|---|
| 2007/0232134 | A1* | 10/2007 | Desrochers | H01R 13/6395 |
| | | | | 439/557 |
| 2011/0020686 | A1* | 1/2011 | Yamamoto | H01M 10/647 |
| | | | | 429/120 |
| 2012/0115353 | A1* | 5/2012 | Watanabe | H01R 13/514 |
| | | | | 439/501 |
| 2013/0260213 | A1* | 10/2013 | Takahashi | H01M 50/20 |
| | | | | 429/159 |
| 2014/0342212 | A1* | 11/2014 | Goesmann | H01M 10/0413 |
| | | | | 429/121 |
| 2015/0295340 | A1* | 10/2015 | Boudreaux | H01R 31/02 |
| | | | | 439/488 |
| 2015/0357609 | A1* | 12/2015 | Lang | H01M 50/20 |
| | | | | 320/113 |
| 2017/0117519 | A1 | 4/2017 | Schoenherr et al. | |
| 2018/0219203 | A1* | 8/2018 | Jones | H01M 50/531 |

OTHER PUBLICATIONS

Written Opinion for PCT/EP2018/071089 dated Oct. 16, 2018 [PCT/ISA/237].

* cited by examiner

MULTI-BATTERY ASSEMBLY AND CONTAINER COMPRISING SUCH AN ASSEMBLY

CROSS REFERENCE TO RELATED APPLICATIONS

This application is a National Stage of International Application No. PCT/EP2018/071089 filed Aug. 2, 2018, claiming priority based on French Patent Application No. 1757492 filed Aug. 3, 2017.

FIELD OF THE INVENTION

The invention relates to a multi-battery assembly, and a housing or container comprising such an assembly. It finds application in particular in the field of high energy density assemblies comprising several stationary Ni—Cd, Ni-MH, lead-acid or Li-ion batteries arranged in a container or in a room. Such assemblies can also be accommodated in large vehicles such as boats.

BACKGROUND OF THE INVENTION

Stationary battery assemblies generally include large passages or corridors the sole purpose of which is to allow for operational maintenance, such as replacement of cells or modules of one of the batteries, maintenance, topping up the water of Ni—Cd batteries, or cleaning. The batteries are organized and arranged in banks or rows in cabinets between which corridors or passages are provided.

For a given multi-battery assembly comprising at least two cabinets with a service corridor between each cabinet, the ratio between the surface area used for this or these corridors when compared to the cumulative surface area of the various parts of the room or container that contains the cabinets, in other words to the surface area which is actually employed for energy storage, is often very large.

The width of such a corridor is generally specified or is regulatory. In the case of Ni—Cd type batteries, the corridors may have a width of 1200 mm or more. Furthermore, the width of the cabinets may vary for example from 500 to 930 mm. Depending on the exact dimensions and the number of cabinets, and consequently of the corridors, more than 50% or even more than 70% of the total surface of the room can be lost in corridors whose usefulness is only occasional.

One example of a multi-battery assembly typical of the prior art is shown in FIG. 1, seen in plan view. In this example, two cabinets 105, 106 separated by a service corridor 104 are arranged in a room 100 or container 100, which is accessed via a service door 102. Another door 101 is provided with direct access to the corridor 104. Each cabinet 105, 106 corresponds to one row or bank of batteries connected in series and/or parallel, each bank comprising one or more superposed levels of batteries, these levels being themselves connected in series and/or in parallel. In this example, each level includes seven batteries.

This example is a good illustration of the fact that the ratio between the surface area lost, that is to say the surface that is not used for accommodating batteries, and the total surface area or the ratio between the lost surface area and the surface area actually used to receive the batteries is not optimal. Conversely, if one considers the ratio between the surface area used for storing energy and total surface area, it is desired that this ratio be as large as possible, in particular since this ratio has a direct relation with stored energy density, relative to the volume occupied by the batteries.

SUMMARY OF THE INVENTION

Unless otherwise stated, in this description, the term "connection" should be taken to mean an electrical connection and/or a connection for data communications, and "being connected" should be taken to mean connected electrically and/or connected for data communications.

One aim of the invention is therefore to find in particular a solution to the problems set out above. Thus, the invention sets out notably to provide a multi-battery assembly with an optimal energy density relative to the volume used while respecting regulatory constraints related to maintenance of such a multi-battery assembly.

The invention thus provides, in a first aspect, a multi-battery assembly comprising at least three banks of connected batteries including two end banks and at least one intermediate bank, each bank being connected to at least one adjacent bank, extending in a first direction and comprising at least one level of several connected batteries, each of the levels extending in the first direction.

At least one of the intermediate banks is a bank which is movable with respect to an adjacent bank in a second direction substantially perpendicular to the first direction, and is connected to said adjacent bank by one of the batteries of one of its levels and by one of the batteries of one of the levels of said adjacent bank by means of a connecting member.

The connecting member is configured to maintain the connection between the movable bank and the adjacent bank while still allowing movement of the movable bank relative to the adjacent bank in the second direction, so as to allow the creation of at least one temporary corridor between the movable bank and the adjacent bank without disconnection, that is to say without loss of connection between the movable bank and the adjacent bank.

According to some embodiments, the multi-battery assembly can include one or more of the following features, either individually or in any technically possible combination:

- each bank is connected to at least an adjacent bank in series and/or in parallel, the levels of each bank being connected together in series and/or in parallel, and the batteries of each level of each bank are connected together in series and/or in parallel;
- the connection between the banks, between the levels of each bank, and between the batteries of each level of each bank is an electrical connection and/or a connection for data communications;
- each connecting member of a movable bank with the adjacent bank has a determined cross section and length, so as to allow it to be bent according to a minimum bend radius when no temporary corridor is created between the movable bank and the adjacent bank, and allow the creation of at least a temporary corridor of defined width between the movable bank and the adjacent bank;
- at least one of the connecting members of a movable bank with the adjacent bank is self-supporting, so as to remain constantly above the movable bank and the adjacent bank;
- the assembly comprises holding means adapted to hold at least one of the connecting members between a movable bank and the adjacent bank permanently above the said movable and adjacent banks;

the holding means include mechanical reinforcing means;

the mechanical reinforcing means comprises a coaxial spring into which a connecting member is inserted;

the mechanical reinforcing means comprises an articulated structure into which there is inserted, or to which there is attached, the connecting member;

the holding means comprise an upper structure and at least one suspending member to be engaged with said upper structure;

the suspending member comprises recall means such as a spring configured so that, firstly when no temporary corridor is created between the movable bank and the adjacent bank connected by the connecting member and when the suspending member is engaged with the upper structure, the recall means is in its rest position, and, alternatively, when a temporary corridor is created between the movable bank and the adjacent bank connected by the connecting member and when the suspending member is attached to the upper structure, the recall means is in an extended position;

the holding means comprises at least one upper rail oriented in the second direction and the suspending member is attached to said upper rail, so as to slide along the said upper rail;

the assembly comprises at least two rails oriented in the second direction, and each movable bank is movable relative to the adjacent bank in the second direction by rectilinear movement along said rails;

at least one of the two end banks occupies a fixed position;

the assembly comprises at least two electrical terminals respectively leaving one of the batteries of one of the levels of two end banks;

the assembly comprises at least one output for communications leaving one of the batteries of one of the levels of one of the banks;

each connecting member is a connecting member for electrical power and/or for data communications;

each bank is formed by a cabinet in which the levels of the batteries of said bank are housed;

each bank is equipped with a locking device for prohibiting, when it is activated, and authorizing when it is de-activated, movement of said bank in the second direction.

The invention also provides, according to a second aspect, a container comprising an assembly as set out above and comprising at least one access for allowing a user to access the assembly.

The volume of the container is determined to enable the creation of a temporary corridor between the movable bank and the adjacent bank, and at least one of the accesses is configured to permit access to said temporary corridor.

According to some embodiments, the container further comprises one or more of the following features, alone or in all technically possible combinations:

the container comprises a top wall, and the upper structure of the assembly comprises said top wall, the suspending member being attached directly to said top wall;

the container comprises a top wall, and the upper structure of the assembly comprises said top wall, the upper rail being suspended from said top wall.

Thus, the multi-battery assembly according to the invention makes it possible to increase, for a given constant storage volume, the energy density stored in the multi-battery assembly, while ensuring reliable, simple and convenient operation, including for maintenance while complying with various regulations.

At constant volume, the stationary multi-battery assembly of the invention can deliver a higher electrical power than the electrical power delivered by a multi-battery assembly of the prior art, and for a longer duration.

During maintenance operations, access to any one of the batteries of the assembly is simplified by shifting one or the other of banks and creating at least one access corridor, without it being necessary to disconnect the banks.

The width of the corridors can be adjusted depending on the application, independently of the number of banks. The greater the volume of the multi-battery assembly, the greater is the gain in storage space compared to a prior art multi-battery assembly having the same volume.

The energy density for a given volume of the assembly can be increased by a minimum of 30 to 40%, or even by more than 200% in some specific configurations, relative to the prior art.

This is made possible by the mobility of banks, for example on rails, and the use of connecting members configured so as not to impede movement.

This provides a solution to the dilemma between ease of carrying out maintenance or servicing on a large multi-battery assembly, and the need to increase the energy density in such a large multi-battery assembly for storing energy. With an assembly according to the invention, the necessary volume dedicated to maintenance can be located exactly where it is needed, and when it is needed.

Furthermore, the solution of the invention makes it possible to limit the area for intervention for maintenance purposes to inside the container or room in which the multi-battery assembly is housed, in other words sheltered from the weather. The invention therefore makes it possible to perform interventions without getting wet for maintenance purposes, even in case of rain, which is often required by the user and/or by regulation.

The features and advantages of the invention will become more apparent on reading the following description, given by way of non-limiting example, with reference to the following figures.

DETAILED DESCRIPTION OF EMBODIMENTS

Figure 1:
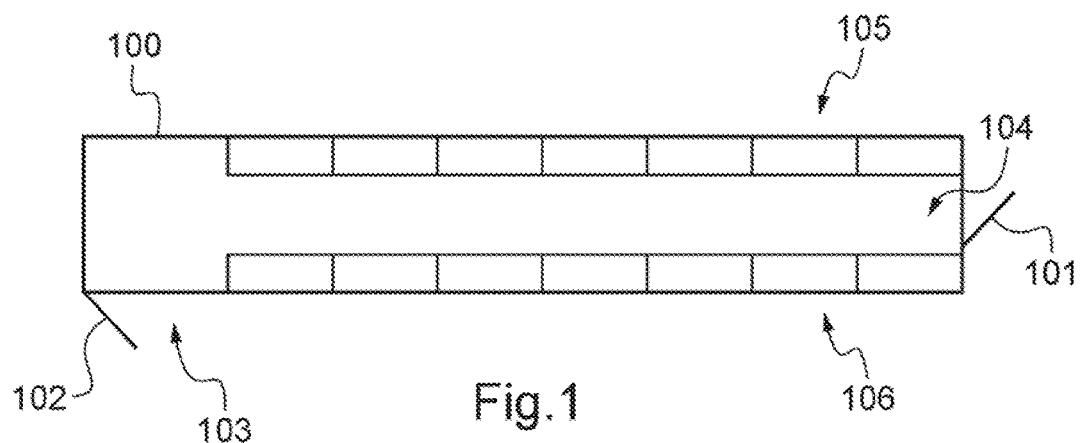
FIG. 1 is a diagrammatic view of a multi-battery assembly in a container, according to the prior art.
Figure 2:
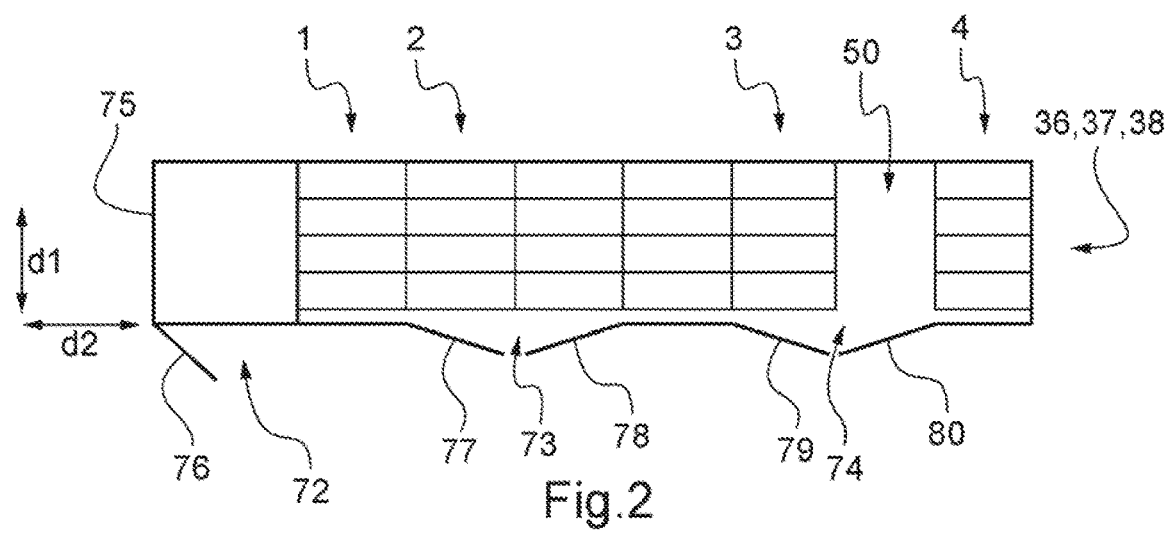
FIG. 2 is a diagrammatic representation in plan view of a multi-battery assembly in a container according to the invention.

FIG. 2 schematically illustrates the major advantages of the invention over a state-of-the-art multi-battery assembly such as that shown in FIG. 1 described above.

FIG. 2 shows an example of a multi-battery assembly of the invention, in plan view, disposed for example in a container or a room. The assembly comprises six banks of batteries connected in series and/or parallel to one or two adjacent banks. Only banks 1-4 carry reference numerals for the sake of simplifying the drawing. However, unless otherwise stated, banks 1-4 (or bank 1-4) designates all of the six (or more) banks.

Each bank 1-4 comprises a plurality of levels placed one on top of the other (which therefore cannot be seen individually in the plan view of FIG. 2), each level of each bank 1-4 comprising a number of batteries, four in the example of FIG. 2, connected in series and/or parallel. The various levels of a bank 1-4 are also connected in series and/or parallel.

Among banks 1-4 of the batteries, the two banks 1 and 4 are end banks, between which the intermediate banks are arranged. Only two intermediate banks 2, 3 carry reference numerals. But unless otherwise stated, intermediate banks 2, 3 designate all four intermediate banks.

Figure 3:
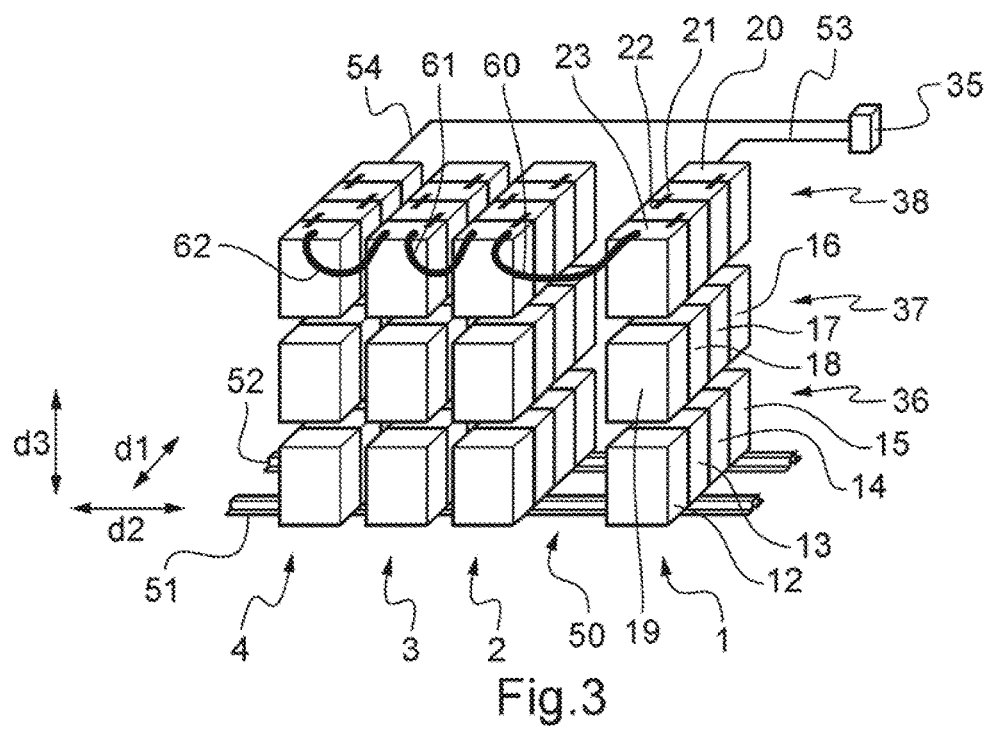
FIG. 3 is a diagrammatic representation of a first embodiment of a multi-battery assembly of the invention.
Figure 9:
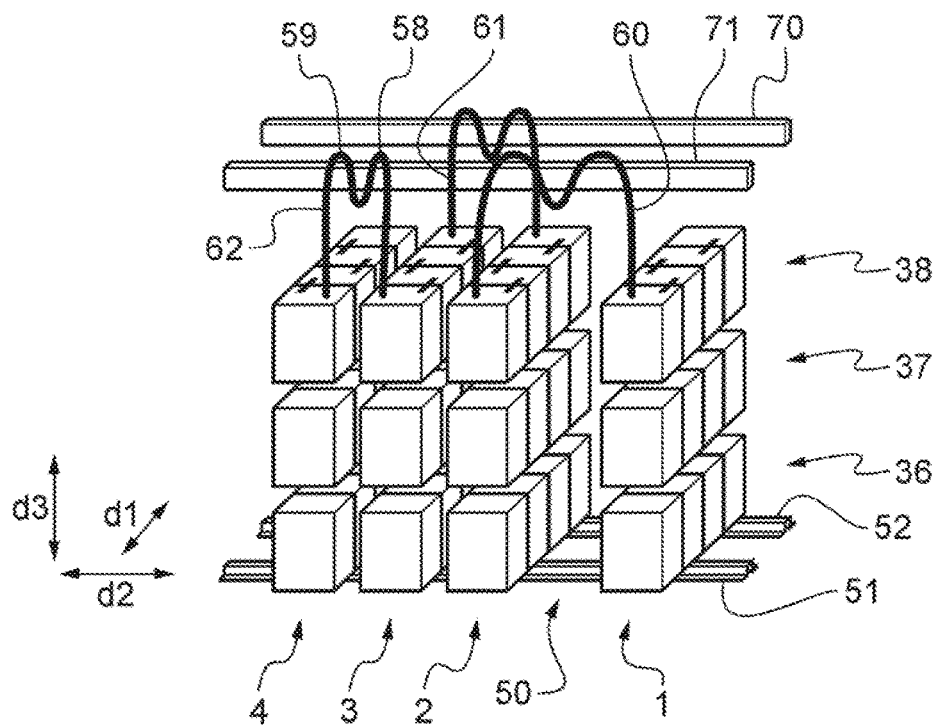
FIG. 9 is a diagrammatic representation of a fifth embodiment of an assembly according to the invention.

Each bank 1-4, extends in a first direction, indicated by reference sign (d1) in FIGS. 2, 3 and 9, and each level of each bank 1-4 extends in the same first direction (d1).

All banks 1-4, or at least all the intermediate banks 2, 3 are movable banks 1-4 with respect to an adjacent bank 1-4 in a second direction indicated by reference sign (d2) in FIGS. 2, 3 and 9, substantially perpendicular to the first direction (d1).

As specifically shown in the two embodiments of FIGS. 3 and 9 respectively, each movable bank 1-4 is connected in series and/or parallel to one of the adjacent banks 1-4 via one of its batteries and one of the batteries of the adjacent bank.

In these two examples, the multi-battery assembly comprises this time four banks 1-4 extending in the first direction (d1), including end banks 1 and 4 and the intermediate banks 2 and 3. Each bank 1-4 comprises three levels 36, 37, 38, stacked in a third direction, not visible in FIG. 2 and indicated by reference sign (d3) in FIGS. 3 and 9, substantially perpendicular to the first and second directions (d1) and (d2). Each level 36, 37, 38 extends in the first direction (d1) and comprises four batteries. Thus, the superposed batteries of each level 36, 37, 38 form four columns extending in the third direction (d3).

To simplify FIG. 3, only the batteries 12 to 23 of the first bank 1 carry reference numerals, and to simplify FIG. 9 no battery is indicated by a reference sign.

There can be seen, more precisely, in FIGS. 3 and 9, showing examples of a multi-battery assembly of the invention in perspective, the series connection and/or parallel connection between batteries of the same level, between the levels of the same bank and between banks.

For example:
Batteries 12 to 15 of level 36 of bank 1 are connected in series and/or parallel,
Batteries 16 to 19 of level 37 of bank 1 are connected in series and/or parallel,
Batteries 20 to 23 of level 38 of bank 1 are connected in series and/or parallel,
Levels 36 to 38 of bank 1 are connected in series and/or parallel, by batteries 1 and 19, and the batteries 16 and 20,
Bank 1 is connected in series and/or parallel to the adjacent bank 2 by the battery 23 of the third level 38 of the first bank 1, and one of the batteries (not indicated by a reference sign) of the third level of the adjacent bank 2.

Connections between banks are performed by means of connecting members 60-62 in FIGS. 3 and 9, and 60 to 63 in FIGS. 4, 5 and 8, which will be described in more detail later.

Each of these connecting members 60 to 63 is configured to maintain the connection between a movable bank 1-4 and the adjacent bank 1-4, while allowing the movement of the movable bank 1-4 with respect to the adjacent bank in the second direction (d2), to allow the creation of at least a temporary corridor 50 between the movable bank 1-4 and the adjacent bank 1-4 without disconnection.

In the examples of FIGS. 3 and 9, connecting members 60 to 62 respectively provide connection between bank 1 and bank 2, between bank 2 and bank 3, and between bank 3 and bank 4.

Thus, by shifting bank 2 with respect to bank 1, a temporary corridor 50 is created between the two banks 1 and 2, without disconnection of the connecting member 60, which allows an operator to carry out maintenance operations on one or other of the batteries in bank 2 or bank 1.

Figure 4:
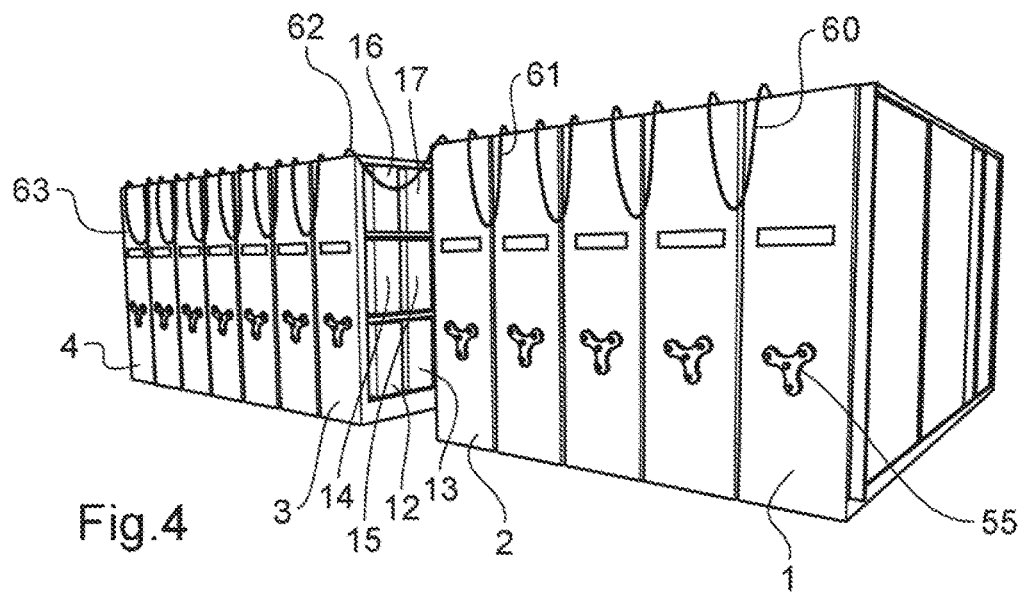
FIG. 4 is a diagrammatic representation of a second embodiment of an assembly according to the invention.
Figure 5:
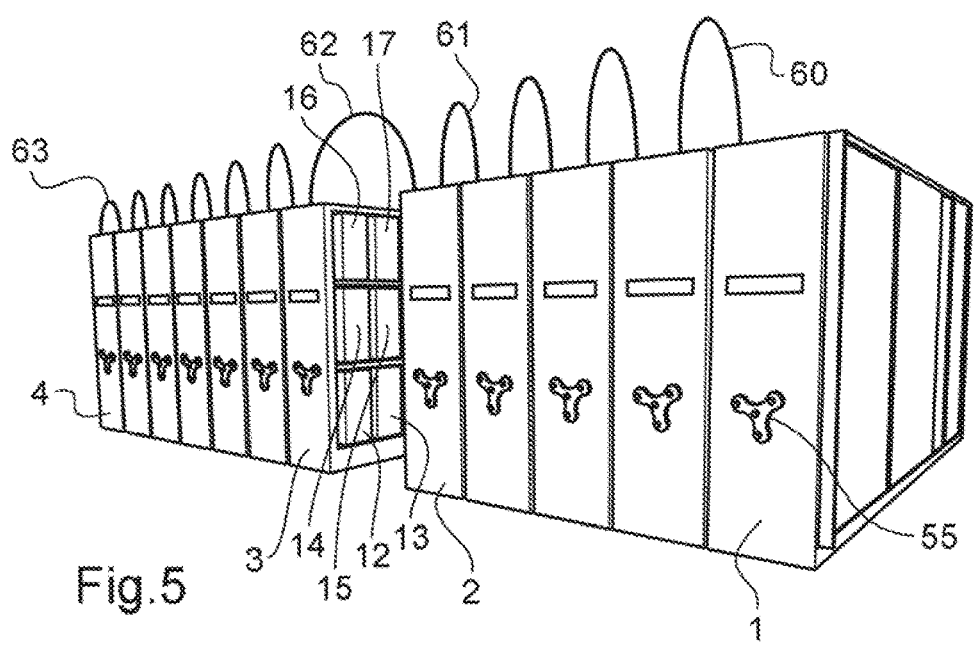
FIG. 5 is a diagrammatic representation of a third embodiment of an assembly according to the invention.
Figure 8:
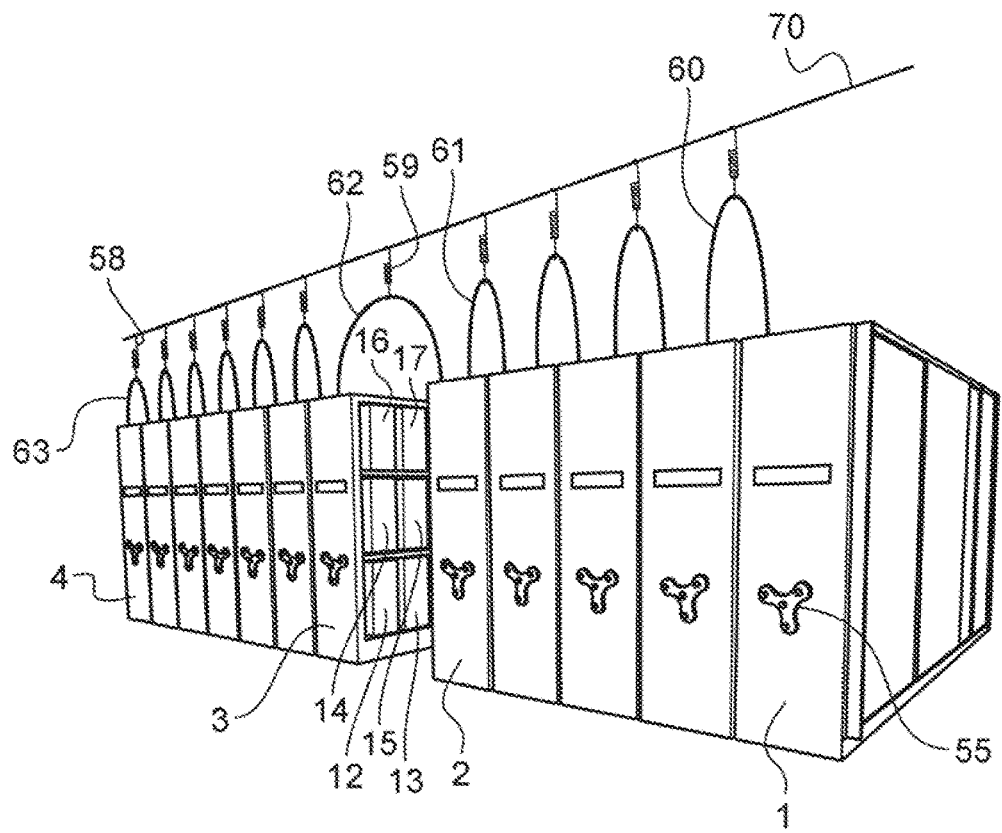
FIG. 8 is a diagrammatic representation of a fourth embodiment of an assembly according to the invention.

In the examples of FIGS. 4, 5 and 8, the multi-battery assembly comprises twelve banks, only banks 1-4 bearing a reference sign, connected in series and/or parallel by means of connecting members of which only connecting members 60 to 63 carry reference numerals. The connecting members 60-63 respectively provide the connection between the end bank 1 and its sole adjacent bank, between bank 2 and bank 3 and between end bank 4 and its sole adjacent bank. Changing the position of e.g. bank 3 with respect to bank 2 creates the temporary corridor 50 between the two banks, leaving the possibility for an operator to carry out maintenance operations on one or the other of the batteries in bank 3 or bank 2 (in the example, on batteries 12 to 17 of bank 3).

These connecting members 60 to 63 may be all on the same side of the assembly, as is the case in FIGS. 3-5 and 8. In a variant, for example that of FIG. 9, these connecting members are arranged alternately on one side and the other of the assembly.

The connecting members 60 to 63 of a movable bank 1-4 with the adjacent bank 1-4, e.g., cable type connection for electrical power and/or data communications, have a predetermined cross section and length which allow both then to be bent according to a minimum bend radius when no temporary corridor 50 is created between the movable bank 1-4 and the adjacent bank 1-4 (such as the connecting members 61 and 62 in the examples of FIGS. 3 and 9, or the connecting members 60, 61 and 63 in the examples of FIGS. 4, 5 and 8), and to allow the creation of at least a temporary corridor 50 of defined width between a movable bank 1-4 and one of the adjacent banks 1-4 (such as connecting member 60 in the examples of FIGS. 3 and 9, or the connecting member 62 in the examples of FIGS. 4, 5 and 8).

This determined length and cross section of the connecting members 60-63 depend in particular on the desired width for the corridor(s) 50.

In the variant of FIG. 5, the connecting members 60 to 63 are of the self-supporting type, which allows them to be permanently maintained above the respective banks 1-4 they connect. These connecting members 60-63 are self-supporting and flexible and their self-supporting nature comes from their inherent mechanical characteristics or through means for reinforcing and/or holding them.

Figure 6:
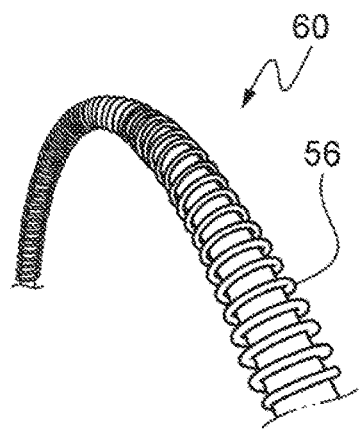
FIGS. 6 and 7 show, respectively, diagrammatic representations of two examples of connecting members between two banks in an assembly according to the invention.
Figure 7:
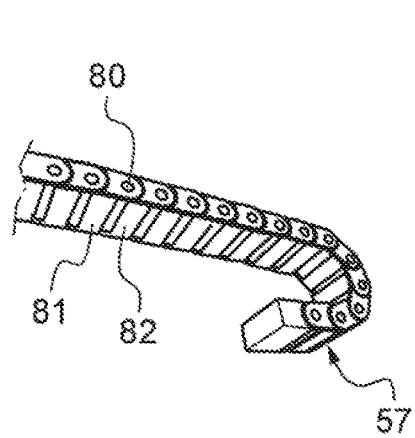

Two examples of connecting members 60 are illustrated respectively in FIGS. 6 and 7.

In FIG. 6, the holding means 56 can maintain the connecting member 60 permanently above the banks it connects. In this example, the holding means 56 consist in mechanical reinforcing means 56, of the coaxial spring type 56, into which connecting member 60 is inserted.

In FIG. 7, the holding means 57, which also allow connecting member 60 to be permanently held above the banks it connects, consist of mechanical reinforcing means 57, of an articulated structure type 57, into which connecting member 60 is inserted. Alternatively, the connecting member 60 could be attached to the outside of the articulated structure 57.

The articulated structure 57 has for example a succession of members 81, 82 connected in pairs by hinges 80.

The mechanical reinforcing means 56, 57 in particular prevents mechanical work of connecting member 60, such as pinching or kinking, during the movement of banks 1-4.

In both the examples of FIGS. 8 and 9, the holding means comprises an upper structure 70, or 70, 71 and suspending members 58, 59 intended to be hung on the upper structure.

More specifically, in the example of FIG. 8, the suspending members 58, 59 comprises a recall means 58, 59, such as a spring 58, 59.

This spring 58, 59 is configured such that when no temporary corridor 50 is created between the movable bank 1-4 and the adjacent bank 1-4 connected by the connecting member 60 to 63 and when suspending member 58, 59 is attached to the upper structure 70, recall means 58, 59 is in its rest position.

Thus, in FIG. 8, no temporary corridor is established for example between the end bank 4 and the single adjacent bank (not indicated by a reference sign) connected by the connecting member 63, and the suspending member 58 is attached to the upper structure 70 formed for example by a cable 70 or a rail 70 extending in the second direction (d2). The recall means 58 is then in its rest position or possibly in a slightly extended position due to the weight of the connecting member 63, and thus maintains the connecting member 63 above the end bank 4 and its adjacent bank.

The spring 58, 59 is further configured so that when a temporary corridor 50 is effectively established between the movable bank 1-4 and the adjacent bank 1-4 connected by the connecting member 60 to 63 and when the suspending member 58, 59 is attached to the upper structure 70, recall means 58, 59 is in an extended position.

Thus, in FIG. 8, a temporary corridor (not indicated by a reference sign in FIG. 8 to avoid cluttering it up) is created between banks 2 and 3 connected by the connecting member 62, and the suspending member 59 is attached to the upper structure 70 formed for example by the cable or rail 70 extending in the second direction (d2). The recall means 59 is then in an extended position, so that when corridor 50 is eliminated (e.g. by moving bank 2 towards bank 3 and bank 3 towards bank 2) recall means 59 maintains the connecting member 62 above banks 2 by reverting to its original rest position.

Optionally, suspending member 58, 59 can slide along upper rail 70 to facilitate the creation and elimination of temporary corridor 50, for example via a roller or intermediate sliding member.

In the example of FIG. 9, connecting members 60 to 62 are each hung at two distinct points to an upper rail 70 or 71. For example connecting member 62 is hooked by the two suspending members 58, 59 to upper rail 71.

In the case where the multi-battery assembly according to the invention is accommodated in a container 75 as shown in FIG. 2, upper structure 70, 71 can be engaged with the upper wall of the container, or constitute this upper wall.

To facilitate the mobility of banks 1-4, at least two rails 51, 52 oriented in the second direction (d2) may be provided to mount banks 1-4, as shown in the example of FIGS. 3 and 9. Thus, each movable bank 1-4 is actually movable relative to one of its adjacent banks 1-4 in the second direction (d2) by rectilinear movement on these rails 51, 52, for example by means of wheels which are guided in these rails 51, 52.

Alternatively, mobility of banks 1-4 can be obtained by mounting the banks on means for displacing them, such as wheels which are unguided.

It is not necessary for all banks 1-4 to be movable, but at least intermediate banks 2, 3 are. The two end banks 1 and 4, or only one of these, may for their part, remain fixed.

As illustrated in the example of FIG. 3, the multi-battery assembly includes at least two power outputs 53, 54 leaving respectively one battery of one of the levels of the two end banks 1 and 4, supplying power to a power supply cabinet 35 and communications outputs.

As illustrated in the examples of FIGS. 4, 5 and 8, banks 1-4 may be formed by cabinets 1-4 in which there are housed the respective battery levels of these banks.

Provision can be made for banks 1-4, such as cabinets 1-4 of FIGS. 4, 5 and 8, to be fitted with a locking device 55, comprising for example a handle 55, for prohibiting, when it is activated, and for allowing, when de-activated, the movement of the bank 1-4 concerned in the second direction (d2), thus creating a corridor between this bank 1-4 and one of the its adjacent banks.

Thus, outside of maintenance periods when cabinet or banks 1-4 do get shifted to create the temporary corridor 50 where this is necessary, the various cabinets 1-4 may be locked together or rendered integral with each other to provide better security.

One solution is to use a locking device 55 further comprising locking means for locking the handle 55 for shifting the cabinet 1-4, for example using a code known only to the person who is to perform maintenance.

Alternatively, one can use jumpers linking cabinets 1-4 together in pairs, locks holding them to the ground, or a combination of these means provided by way of example only.

FIG. 2 described above shows, in plan view, a multi-battery assembly according to the invention housed in a container 75 without an upper wall or with its upper wall not drawn for simplicity.

At least one of the accesses 72 to 74 is provided to allow a user access to the assembly.

The volume, thus in particular the bottom surface area of container 75 is determined to enable creation of the temporary corridor 50 between the movable banks and one of their adjacent banks.

At least one of the accesses 72 to 74 is configured to allow access to the temporary corridor 50.

Thus, in the example of FIG. 2, access 76 provides access to bank 1, access 73 provides access to a temporary corridor to be established between bank 2 and one of its two adjacent banks, and access 74 provides access to the corridor 50 created between the two banks 3 and 4 or to the corridor to be established between bank 3 and its other adjacent bank. Doors 76-80 are provided at the respective accesses 72-74.

Table 1 below shows the gain in energy density with a multi-battery assembly of the invention when compared to the prior art, in the case of a temporary corridor 50 of a regulatory width of 900 mm, as a function of the number of banks 1-4 and the width of the banks 1-4.

TABLE 1

| Width of corridor: 900 mm Width of banks 1 to 4 (mm) Number of banks 1 to 4 | 500 Gain (Wh/L) | 930 Gain (Wh/L) |
|---|---|---|
| 3 | 38% | 24% |
| 4 | 62% | 39% |
| 5 | 79% | 49% |
| 6 | 92% | 56% |
| 7 | 102% | 61% |
| 8 | 110% | 65% |
| 9 | 117% | 68% |

According to the invention, it can be seen that there is an improvement in energy density of from 24% to 68% for banks 1-4 that are 930 mm wide and from 38% to 117% for banks 1-4 which are narrower (500 mm wide) with a 900 mm maintenance corridor.

The corridor width is very often greater than 1000 mm, or even frequently greater than or equal to 1200 mm for practical reasons of handling deep battery modules, or in order to be able to open the cabinet doors.

Calculation of the gain in energy density for example with a regulatory corridor width of 1200 mm and for the two same widths of battery cabinet as previous is shown in Table 2 below.

TABLE 2

| Width of corridor: 1200 mm Width of banks 1 to 4 (mm) Number of cabinets | 500 Gain Wh/L | 930 Gain Wh/L |
|---|---|---|
| 3 | 44% | 30% |
| 4 | 75% | 49% |
| 5 | 97% | 62% |
| 6 | 114% | 71% |
| 7 | 128% | 78% |
| 8 | 138% | 83% |
| 9 | 147% | 88% |

Energy density can be more than doubled (+147%) in the case of very large multi-battery assembly configurations.

Beyond improving energy density of the system, the invention reduces floorspace used for storage of batteries in the same proportions. For a specific application, this allows to reduce the volume required to be built, air-conditioned and, optionally, made secure with a corresponding reduction in cost and constraints.

This description is given by way of example and is not limiting of the invention, in particular as regards the number of batteries per level, the number of battery levels per bank, the number of banks, the type of battery, or the number of cells per battery.

The invention claimed is:

1. A multi-battery assembly comprising at least three banks (1-4) of connected batteries (12 to 23) comprising two end banks (1, 4) and at least one intermediate bank (2, 3), each bank (1-4) being connected to at least one adjacent bank, each bank extending in a first direction (d1), and each bank comprising at least one level (36 to 38) of several connected batteries (12 to 23), each of said levels extending in the first direction (d1),
wherein at least each intermediate bank is a movable bank which is movable relative to an adjacent bank in a second direction (d2) substantially perpendicular to said first direction (d1), and is connected to said adjacent bank via one of the batteries (12 to 23) of one of its levels (36-38) and one of the batteries of any one of the levels of said adjacent bank by means of a connecting member (60 to 63), said connecting member being configured to maintain the connection between the movable bank and the adjacent bank while allowing movement of the movable bank with respect to an adjacent bank in said second direction (d2), so as to allow the creation of at least a temporary corridor (50) between the said movable bank and the adjacent bank without disconnection,
and wherein at least one of the connecting members of a movable bank with the adjacent bank is self-supporting, so as to remain constantly above the movable bank and the adjacent bank.

2. The assembly according to claim 1, wherein each bank is connected to at least an adjacent bank in series and/or in parallel, the levels (36 to 38) of each bank being connected together in series and/or in parallel, and the batteries of each level of each bank are connected together in series and/or in parallel.

3. The assembly according to claim 1, wherein the connection between the banks, between the levels of each bank, and between the batteries of each level of each bank is an electrical connection and/or a connection for data communications.

4. The assembly according to claim 1, wherein each connecting member (60 to 63) of a movable bank with the adjacent bank has a determined cross section and length, so as to allow it to be bent according to a minimum bend radius when no temporary corridor is created between the movable bank and the adjacent bank, and allow the creation of at least a temporary corridor of defined width between the movable bank and the adjacent bank.

5. The assembly according to claim 1, wherein it comprises holding means adapted to hold at least one of the connecting members between a movable bank and the adjacent bank permanently above the said movable and adjacent banks.

6. The assembly according to claim 5, wherein the holding means include mechanical reinforcing means.

7. The assembly according to claim 6, wherein the mechanical reinforcing means comprises a coaxial spring into which a connecting member is inserted.

8. The assembly according to claim 6, wherein the mechanical reinforcing means comprises an articulated structure into which there is inserted, or to which there is attached, the connecting member.

9. The assembly according to claim 5, wherein the holding means comprise an upper structure and at least one suspending member to be engaged with said upper structure.

10. The assembly according to claim 9, wherein the suspending member comprises recall means such as a spring configured so that, firstly when no temporary corridor is created between the movable bank and the adjacent bank connected by the connecting member and when the suspending member is engaged with the upper structure, the recall means is in its rest position, and, alternatively, when a temporary corridor is created between the movable bank and the adjacent bank connected by the connecting member and when the suspending member is attached to the upper structure, the recall means is in an extended position.

11. The assembly according to claim 9, wherein the upper structure comprises at least one upper rail oriented in the second direction and the suspending member is attached to said upper rail, so as to slide along the said upper rail.

12. The assembly according to claim 1, further comprising at least two rails oriented in the second direction and each movable bank is movable relative to the adjacent bank in the second direction by rectilinear movement along said rails.

13. The assembly according to claim 1, wherein at least one of the two end banks occupies a fixed position.

14. The assembly according to claim 1, further comprising at least two electrical terminals respectively leaving one of the batteries of one of the levels of two end banks.

15. The assembly according to claim 1, further comprising at least one output for communications leaving one of the batteries of one of the levels of one of the banks.

16. The assembly according to claim 1, wherein each connecting member is a connecting member for electrical power and/or for data communications.

17. The assembly according to claim 1, wherein each bank is formed by a cabinet in which the levels of the batteries of said bank are housed.

18. The assembly according to claim 1, wherein each bank is equipped with a locking device for prohibiting, when it is activated, and authorizing when it is de-activated, movement of said bank in the second direction.

19. A container comprising an assembly according to claim 1, comprising at least one access for allowing a user to access the assembly, wherein a volume of the container is determined to allow creation of a temporary corridor between a movable bank and an adjacent bank, and in that at least one of the accesses is configured to allow access to said temporary corridor.

20. The container according to claim 19 comprising a top wall and holding means adapted to hold at least one of the connecting members between a movable bank and the adjacent bank permanently above the said movable and adjacent banks, wherein the holding means comprise an upper structure and at least one suspending member to be engaged with said upper structure, and the upper structure comprises said top wall, and the suspending member is suspended directly from said top wall.

21. The container according to claim 19 comprising a top wall and an upper structure comprising at least one upper rail oriented in the second direction and a suspending member is attached to said upper rail, so as to slide along the said upper rail, wherein the upper structure comprises said top wall, and the upper rail is attached to said top wall.

* * * * *